Sept. 25, 1945.　　　　　　J. LYON　　　　　　2,385,633
BEAK AND WING TRIMMER AND CAUTERIZER FOR FOWL AND THE LIKE
Filed Aug. 11, 1944　　　2 Sheets-Sheet 1

Inventor
James Lyon.
By Christian R. Nielsen
Attorney

Sept. 25, 1945. J. LYON 2,385,633
BEAK AND WING TRIMMER AND CAUTERIZER FOR FOWL AND THE LIKE
Filed Aug. 11, 1944 2 Sheets-Sheet 2
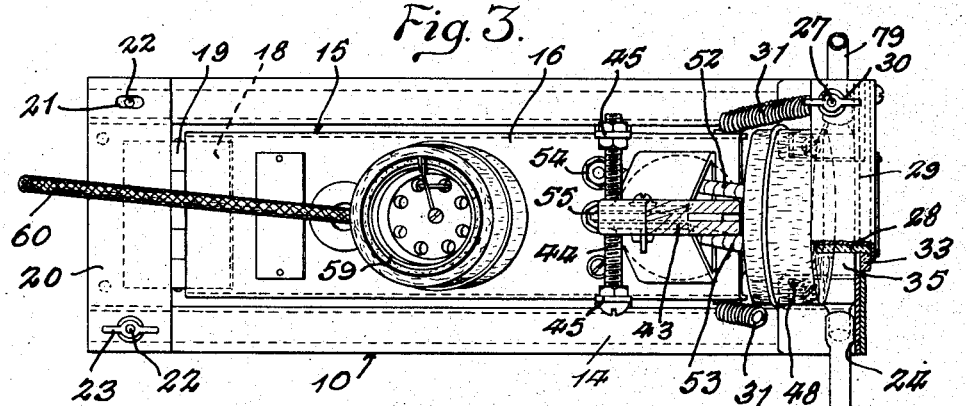
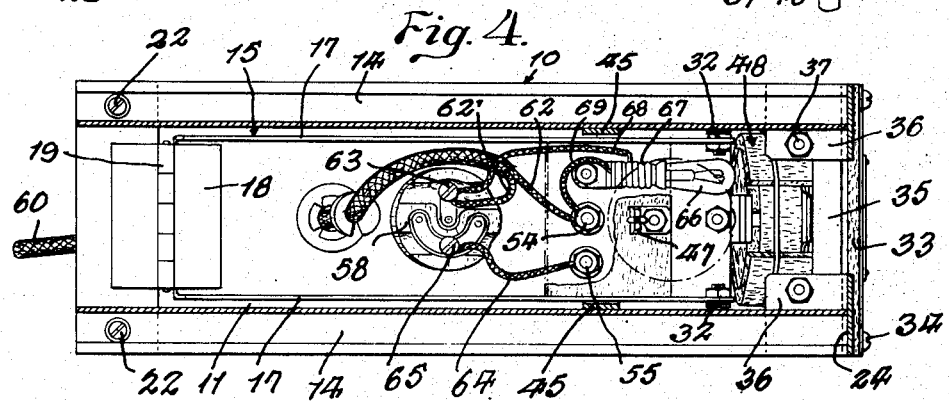
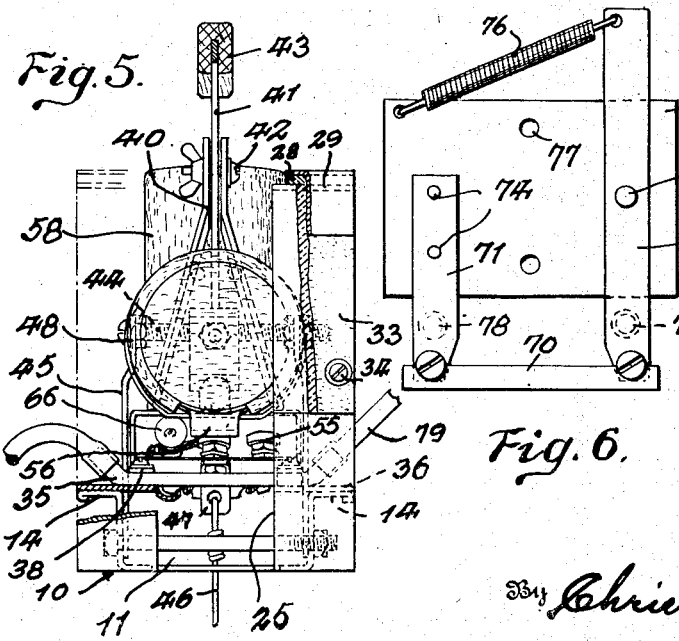
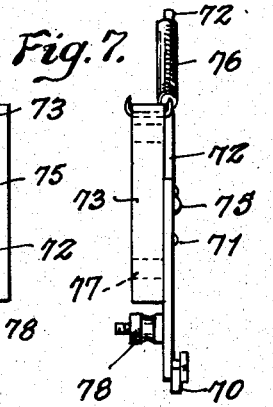
Inventor
James Lyon.
By Christian R. Nielsen
Attorney Patented Sept. 25, 1945

2,385,633

UNITED STATES PATENT OFFICE 2,385,633

BEAK AND WING TRIMMER AND CAUTERIZER FOR FOWL AND THE LIKE

James Lyon, San Diego, Calif.

Application August 11, 1944, Serial No. 549,031

5 Claims. (Cl. 128—303.10)

This invention relates to a means for trimming beaks and wing clipping of poultry and other fowl, and it consists in the constructions, arrangements and combinations herein described and claimed.

It is a particular object of the invention to provide a trimming device wherein a beak or wing portion of fowl may be severed by means of a heated cauterizing edge element.

It is also an object of the invention to provide means for regulating the amount of heat supplied to the cauterizing edge to meet various conditions as well as to lengthen the period of use of the cauterizing edge, since excessive constant heat will tend to reduce the life of the edge element.

More specifically it is an object of the invention to provide an apparatus of the kind indicated in which a supporting base is provided upon which a carriage is swingably mounted, resiliently supported in elevated position, the carriage including a cauterizing edge cooperable with a water-cooled anvil upon downward movement of the carriage.

Additional objects, advantages and features of invention will be apparent from the following description considered in conjunction with the accompanying drawings, wherein Figure 1 is a perspective view of the device.

Figure 3 is a top plan view, partly in section.

Figure 4 is a cross section on the line 4—4 of Figure 2.

Figure 5 is a front elevation, partly in section.

Figure 6 is a plan view of a modified form of cauterizing edge and mounting therefor.

Figure 7 is an edge view thereof.

Figure 1:
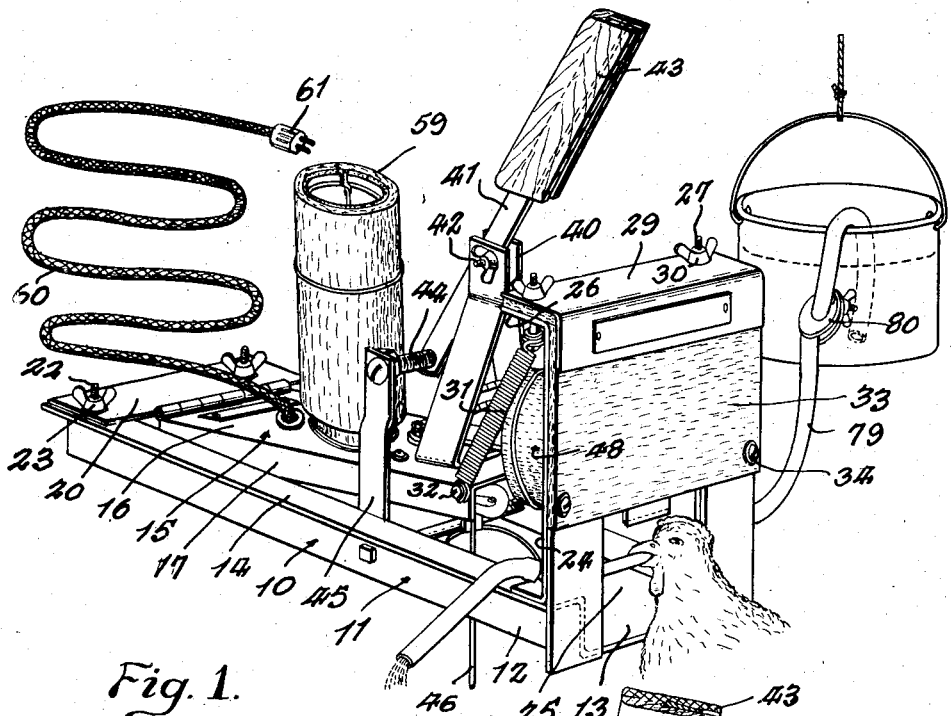

There is illustrated a machine 10 comprising a base frame 11, which in the present instance, is shown as a rectangular trough defined by integrally connected side walls 12 and bottom wall 13. The side walls 12 are each provided with a horizontal flange 14, for support of a carriage 15.

The carriage 15 consists of a top wall 16 and respective side walls 17, the over-all width being such as to permit free introduction within the trough portion of the base 11. The length of the carriage 15 is substantially shorter than the base 11 and at the rear end thereof a leaf 18 of a hinge 19 is secured, the other leaf of the hinge being connected to a plate 20 extended transversely across the flanges 14. The plate 20 is detachably mounted upon the flanges which in the present instance is accomplished by providing longitudinal slots 21 in the plate 20, the flange 14 being apertured, and through the slots and apertures a bolt 22 is extended to receive a wing nut 23. By the provision of the slots, it will be apparent that longitudinal adjustment of the carriage with respect to the base is made possible.

At the front end of the base 11, an upright frame piece 24 is welded or otherwise secured to each of the flanges 14. The width of these frame pieces is greater than the width of the flanges thus forming a base upon which an anvil may be mounted, as will be described. As may be seen in Figure 1, the frame pieces 24 define an opening 25. The upper ends of the frame pieces 24 are formed with right angular extensions 26 each of which is provided with an opening for reception of a threaded bolt 27. A strip of heat-resisting material 28 is extended across the extensions 26, the strip being apertured to accommodate the bolt 27, an angularly shaped finishing plate 29 being disposed upon the strip and likewise apertured to receive the bolt 27. A wing nut 30 is engaged upon the bolt for the purpose of adjustment of the carriage, as will be described. A helical spring 31 is secured to the head of the bolts 27, the opposite end being attached to the forward end of the carriage 15 as at 32. It will be apparent that the tension of the springs may be varied by adjusting the wing nuts 30.

A front heat guard 33 is detachably mounted upon the frame piece 24 by means of screws 34, the guard stopping short of an anvil 35 mounted transversely across the flanges 14, to the rear of the frame piece 24.

Figure 2:
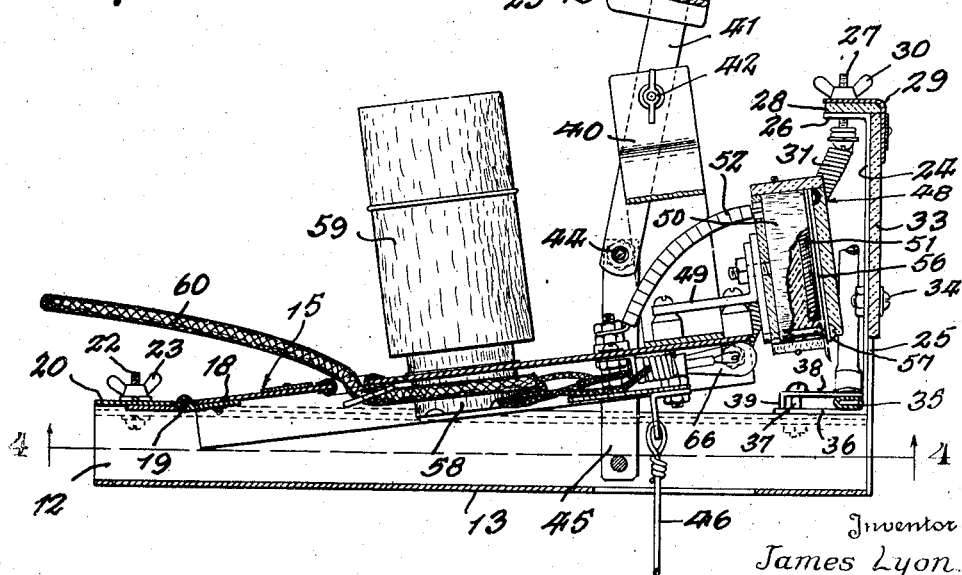
Figure 2 is a vertical section therethrough.

As may be seen in Figures 2 and 4, the frame pieces 24 are formed with right angularly disposed supporting feet 36 apertured to receive respective bolts 37 which in conjunction with a clamp plate 38 function to secure the anvil 35 in proper position upon the base. The clamp plate 38 is illustrated as having a leg 39 adapted to rest upon respective feet 36 and with the anvil engaged beneath the plate tightening of the bolt will firmly secure the anvil. The plate 38 is of such length as to permit adjustment of the anvil longitudinally of the base, which is made possible by merely loosening the bolts 37.

The device is constructed for either hand or foot operation, as will now be described. Upon the carriage 15 at the forward end, a fulcrum 40 is mounted, the upper end of which swingably mounts a lever 41, the pivot 42 being next adjacent the handle 43. The free end of the lever 41 is apertured and receives a shaft 44 carried between uprights 45 pivotally mounted upon respective side walls 12 of the base. It will be seen that by exerting a downward pull upon the handle 43, a corresponding movement will be imparted to the carriage 15 against the tension of the springs 31, the latter functioning to return the carriage to normal position upon release of the handle. The mounting of the lever 41 and the carriage is such that a limited lateral movement may be imparted to the carriage by moving the lever laterally from side to side which is of importance when severing a beak of substantial thickness, since any tendency to crush the beak is obviated. In the event that it is desired to operate the carriage by means of a foot treadle or the like, a pull cord 46 is secured to a bracket 47 fixed to the underside of the carriage 15, the other end of the cord being connected to a foot treadle not shown. A downward pull on the cord will effect a similar movement of the carriage.

At the front end of the carriage 15 a heater unit 48 is secured by means of bracket 49. The heater in the present instance consists of an insulator body 50 within which a heater coil 51 is mounted, energized through wires 52 and 53, the latter being connected to binding posts 54 and 55, respectively. A cutting and cauterizing blade 56 is mounted in the body 50 by means of bolts 57 maintaining the blade closely adjacent the coil 51 for heating purposes. The blade 56 projects beyond the periphery of the body 50 so as to cooperate with the anvil 35 to effect the cutting of a beak disposed upon the anvil. It will be noted that the blade 56 may be readily replaced by removing the bolts 57.

Upon the carriage 15 an electrical socket 58 is secured within which there is removably mounted a resistance element 59, of conventional construction. The resistor and the heater unit are connected in series, as may be seen in Figure 4. A conventional conductor 60 is employed, having a connector plug 61 for establishing connection with an electrical source, one line 62 being connected to the binding post 54, while the other line 62' is connected to a binding post 63 of the socket 58. A line 64 is secured between the binding post 55 and a post 65 of the socket, completing the circuit to the heater unit.

It is desirable in many situations, to have an illumination means, so that the operation of trimming a beak or wing-tip is clearly discernible and as shown, a small bulb 66 is mounted in a socket 67, located upon the underside of the carriage 15, the circuit to the socket 67 being established through a lead 68 connected to the binding post 63 and through a lead 69 connected to the base of the socket and the binding post 54.

The resistor element 59 is preferably threadedly engaged in the socket 58, in order that it may be readily removed for replacement by a resistor of greater or lesser resistance, and in this manner, the amount of heat at the cutting or cauterizing edge of the blade can be regulated.

In the modified form of the device shown in Figures 6 and 7, the cutting and cauterizing blade is shown as a strip 70, supported between respective depending legs 71 and 72, mounted upon an insulating base 73. The leg 71 is rigidly fixed to the base 73 as indicated at 74, while the leg 72 is pivoted to the base as indicated at 75, and this leg it will be noted, extends a distance above the upper edge of the base plate where it is apertured, for mounting of a tension spring 76. The other end of the spring is anchored at a suitable point upon the base 73. The pivotal mounting of the leg 72 in conjunction with the spring 76 allows for heat expansion and contraction of the resistance or heater strip 70. This modified form of cutter may replace the heater coil 51 and associated cutter, and to this end the base 73 is provided with openings 77 through which the bolts 57 may be extended and secured to the bracket 49. A 4-V-100 watt transformer is preferably used in conjunction with this type of blade and heater, replacing the resistor 59, electrical connection between the transformer and the heater being made with respective binding posts 78 on the legs 71 and 72.

In use of the device, the upper beak of a fowl is placed upon the anvil as shown in Figure 1, and with the apparatus connected to a source of current, the blade 56 having been heated to desired temperature, the handle 43 is grasped and pulled downwardly, bringing the cutting and cauterizing edge of the blade in contact with the beak. If the beak is of a heavy structure, such as in grown fowl, a lateral movement may be imparted to the handle, which will produce a similar movement to the blade, which movement together with downward pressure will quickly and neatly sever the beak. Where a large number of fowl are being operated on, the anvil will be heated to an uncomfortable degree, and to reduce the temperature, cooling water may be fed to the anvil by means of a hose 79, the flow of water being controlled by a suitable clamp 80.

In the case of wing clipping, the tip is removed at the first joint. It is advisable during this operation to remove the heat guard 33 in order to afford ample clearance and visibility, which is especially true with full-grown fowl.

While I have shown and described the invention specifically, this is by way of illustration only, and I consider as my own all such modifications in construction as fairly fall within the scope of the appended claims.

I claim:

1. A beak and wing trimming device comprising an elongated horizontally disposed trough member, a carriage disposed within the trough and swingably mounted at one end spaced upright frame members at the opposite end of said trough, an anvil mounted rearwardly of the upright frame members and extending transversely of the trough, a heater unit mounted upon the free end of said carriage, including a heating coil, a blade carried by said heater unit in heat transfer relation to said heating coil, means for supplying electrical energy to said heating coil, means for moving the free end of the carriage downwardly to effect a cooperative relation between the anvil and said blade and means for returning said carriage to normal inoperative position.

2. A beak and wing trimming device comprising a base, a vertically swingable carriage on the base, spaced upright frame members on the base in advance of the carriage, adjustable resilient means connected between upper portions of the frame members and respective sides of the carriage, an electrically heated blade carried by the free end of the carriage, an anvil transverse of the base in the path of the blade, a fulcrum on the carriage, a hand lever pivotally mounted on said fulcrum, and link means pivotally connected between said hand lever and said base.

3. The structure of claim 2, in which the pivotal connection between said hand lever, fulcrum and said link means is such as to permit limited lateral movement of the carriage upon lateral movement of the hand lever.

4. A beak and wing trimming device comprising a base, a vertically swingable carriage on the base, spaced upright frame members on the base, adjustable resilient means connected between upper portions of the frame members and respective sides of the carriage, an electrical heated blade carried by the free end of the carriage, an anvil transverse of the base, in the path of the blade, and said carriage having treadle operating means connected thereto adjacent the free end of the carriage.

5. A beak and wing trimming device comprising a base, a vertically swinging carriage on the base, spaced upright frame members on the base, adjustable resilient means connected between upper portions of the frame members and the carriage, an electrically heated resistance blade carried by the free end of the carriage, an anvil transverse of the base, in the path of the blade, and means for moving the free end of the carriage downwardly to effect a cooperative relation between the blade and the anvil.

JAMES LYON.